United States Patent [19]

Otani et al.

[11] Patent Number: 5,918,413
[45] Date of Patent: Jul. 6, 1999

[54] COATED SEED AND PROCESS FOR PRODUCING THE SAME

[75] Inventors: Takamitsu Otani; Hiroyuki Nakata; Toshikazu Akao; Yoshihiro Maeda, all of Kyoto, Japan

[73] Assignees: Dai-Ichi Kogyo Seiyaku Co., Ltd.; Takii Shubyo Kabushiki Kaisha, both of Kyoto, Japan

[21] Appl. No.: 09/094,121

[22] Filed: Jun. 9, 1998

[51] Int. Cl.⁶ .............................. A01C 1/06; A01B 79/00; C08J 3/02
[52] U.S. Cl. ........................... 47/57.6; 47/58.1; 524/447; 524/448; 442/166; 442/193; 514/772.2
[58] Field of Search ..................... 47/57.6, 58.1; 524/447, 448; 442/166, 193; 514/772.2

[56] References Cited

U.S. PATENT DOCUMENTS

| | | | |
|---|---|---|---|
| 2,967,376 | 1/1961 | Scott, Jr. | 47/1 |
| 3,698,133 | 10/1972 | Schreiber | 47/57.6 |
| 3,905,152 | 9/1975 | Loperfido | 47/57.6 |
| 3,947,996 | 4/1976 | Watts | 47/57.6 |
| 3,950,891 | 4/1976 | Hinkes | 161/19 |
| 4,251,952 | 2/1981 | Porter et al. | 47/57.6 |
| 4,753,035 | 6/1988 | Ryan et al. | 47/57.6 |
| 4,802,305 | 2/1989 | Kojimoto et al. | 47/57.6 |
| 5,127,185 | 7/1992 | Kojimoto et al. | 47/57.6 |
| 5,525,131 | 6/1996 | Asano | 47/57.6 |

FOREIGN PATENT DOCUMENTS

| | | |
|---|---|---|
| 09 154319 | 6/1997 | European Pat. Off. . |
| 2071376 | 9/1971 | France . |
| 38-3469 | 4/1963 | Japan . |
| 51-51106 | 5/1976 | Japan . |
| 54-85908 | 7/1979 | Japan . |
| 54-130311 | 10/1979 | Japan . |
| 60-12905 | 1/1985 | Japan . |
| 03080004 | 4/1991 | Japan . |
| 5-015208 | 1/1993 | Japan . |
| 8-056425 | 3/1996 | Japan . |
| 1294161 | 10/1972 | United Kingdom . |
| 2025200 | 1/1980 | United Kingdom . |

*Primary Examiner*—Robert A. Wax
*Assistant Examiner*—Tekchand Saidha
*Attorney, Agent, or Firm*—Jordan and Hamburg

[57] ABSTRACT

The present invention is characterized by coating a seed with from 0.1 to 25% by weight of a powder (A) composed of one or both of montmorillonite and bentonite and having an average particle diameter of 30 $\mu$m or less and from 99.9 to 75% by weight of a powder (B) composed of a material other than montmorillonite and bentonite and having an average particle diameter of at least 10 $\mu$m and at most 30 $\mu$m using a polyvinyl alcohol aqueous solution having an aqueous solution viscosity at 25° C. of 50 mPa·s or less as a binder. Consequently, a coated seed obtained by coating a seed, especially a light-favoured seed, easily absorbs water in sowing and is easily cracked in absorbing water. Further, the easy cracking thereof remains unchanged with the course of time. In the coating, formation of by-product seedless spherical pellets is little observed.

10 Claims, No Drawings

COATED SEED AND PROCESS FOR PRODUCING THE SAME

FIELD OF THE INVENTION

The present invention relates to a coated seed and a process for producing the same. More specifically, the present invention relates to a coated seed obtained by coating a light-favoured seed such as a flower seed and the like, and a process for producing the same.

PRIOR ART

It has been so far known that for labor-saving in the farm working, a powder such as a tuff loam or a clay is coated on vegetable seeds with a fluidized bed-type granulator or an inclined rotary pan-type granulator using a binder such as polyvinyl alcohol or carboxymethyl cellulose (for example, JP-B-38003469).

When the coated seeds thus-obtained are sown and in contact with appropriate water in the soil, the coated layer absorbs water, and cracking occurs in 2 or 3 portions, whereby the coated layer is broken in a block state, and the seeds germinate.

Especially, light-favoured seeds such as flower seeds require light in germination. Thus, these seeds are put on the surface of the soil without being embedded therein so that they are liable to receive light.

However, even if the conventional coated seed absorbs water in sowing, its coated layer is not cracked well. That is, even when the conventional coated seed absorbs water, the coated layer is not cracked, or it is cracked only with a small width, so that the seed is not exposed to light satisfactorily. For this reason, in the above-mentioned light-favoured seeds, light is blocked, and satisfactory germination is inhibited. Further, the conventional coated seed is problematic in that immediately after the production, the coated layer is cracked, but it can hardly be cracked with the course of time.

In addition, since light-favoured seeds such as flower seeds and the like are fine seeds, seedless spherical pellets are formed as by-products when a coating composition of some particle diameter is used. In order to solve the problem of formation of by-product seedless spherical pellets, it is proposed that a particle diameter of a coating composition is set at less than 20 $\mu$m (JP-A-07321542). However, when the particle diameter of the coating composition is 20 $\mu$m or more, the problem remains still unsolved.

SUMMARY OF THE INVENTION

It is an object of the present invention to provide a coated seed which is obtained by coating a seed, especially a light-favoured seed, which easily absorbs water in sowing, which is easily cracked in absorbing water and easy cracking of which remains unchanged with the course of time, and a process for producing the same in which formation of by-product seedless spherical pellets is little observed.

The coated seed of the present invention is obtained by coating a seed with from 0.1 to 25% by weight of a powder (A) composed of one or both of montmorillonite and bentonite and having an average particle diameter of 30 $\mu$m or less and from 99.9 to 75% by weight of a powder (B) composed of a material other than montmorillonite and bentonite and having an average particle diameter of at least 10 $\mu$m and at most 30 $\mu$m using a polyvinyl alcohol (hereinafter abbreviated as "PVA") aqueous solution having an aqueous solution viscosity at 25° C. of 50 mPa·s or less as a binder.

The average particle diameter here refers to an average volume diameter measured by a laser diffraction/scattering method.

It is advisable that one or both of calcined diatomaceous earth and flux-calcined diatomaceous earth occupy at least 50% by weight of the powder (B).

Further, it is advisable that montmorillonite and bentonite of the above-mentioned powder (A) are sodium montmorillonite and sodium bentonite having a swelling force of 12 ml/2 g or more.

Still further, it is advisable that PVA has a degree of polymerization of from 300 to 1,800 and a degree of saponification of from 70 to 90%.

In the coated seed of the present invention, the coated layer thereof easily absorbs water in sowing, and is easily cracked. Further, the easy cracking thereof remains unchanged with the course of time. Accordingly, light-favoured seeds are liable to receive light, and germinate well. Still further, with the above-mentioned specific combination of the coating composition and the binder, by-product seedless spherical pellets are hardly formed even when the particle diameter of the coating composition is 20 $\mu$m or more.

Light-favoured seeds such as flower seeds and the like tend to be influenced by the binder in the growth thereof. However, in the coated seed of the present invention, the coated layer is cracked well in absorption of water, and it is satisfactorily peeled off from the seed, so that the binder little influences the growth.

DETAILED DESCRIPTION OF THE INVENTION

The present invention is specifically described below.

(1) Coating composition

The coating composition contains a powder-coating material composed of from 0.1 to 25% by weight of a powder (A) composed of one or both of montmorillonite and bentonite and having an average particle diameter of 30 $\mu$m or less and from 99.9 to 75% by weight of a powder (B) composed of a material other than montmorillonite and bentonite and having an average particle diameter of at least 10 $\mu$m and at most 30 $\mu$m.

It is advisable that in order to more increase the above-mentioned effect, the powder (A) is composed of montmorillonite and/or bentonite having an average particle diameter of 30 $\mu$m or less. That is, it is advisable that a single powder when the powder (A) is composed of the single powder, or each of plural powders when the powder (A) is composed of the plural powders, has an average particle diameter of 30 $\mu$m or less. Unless the above-mentioned effect is impaired, montmorillonite and/or bentonite having an average particle diameter of more than 30 $\mu$m may be added thereto. However, the average particle diameter of the overall powder (A) is required to be 30 $\mu$m or less.

It is preferable that the average particle diameter of the powder (A) is at least 0.5 $\mu$m and at most 20 $\mu$m.

Montmorillonite is a clay mineral of a laminar structure composed mainly of silica, alumina and magnesia, and bentonite is a clay mineral composed mainly of this montmorillonite. Since both of these materials have a large inner surface area and a high hydration force, they are rich in water absorption and swellability. Therefore, when they are incorporated in the coating composition in amounts of from 0.1 to 25% by weight, the coated layer easily absorbs water, and is easily cracked through water absorption. When the content of the powder (A) is less than 0.1% by weight, this effect is not satisfactorily provided. When it exceeds 25% by weight, the coated layer is rather hard to crack. The higher the content of the powder (A), the degree of cracking of the coated layer in water absorption is increased due to its swelling force. However, the powder (A) is not only swollen, but also does it play a part of preventing the other powder from flowing out through water absorption. For this reason, when the content of the powder (A) exceeds 25% by weight, the hardness of the coated layer is increased owing to the binding ability of the powder (A).

It is advisable that montmorillonite and bentonite of the powder (A) have the swelling force of 12 ml/2 g or more. When it is less than 12 ml/2 g, the coated layer is not satisfactorily cracked in coating light-favoured seeds.

Montmorillonite and bentonite include sodium type, calcium type and potassium type depending on types of exchangeable cations of crystal layers. Of these, the sodium type is especially excellent in a swelling force. Accordingly, in the present invention, it is advisable to use a sodium type, namely, sodium montmorillonite and sodium bentonite. It is especially preferable that its swelling force is 12 ml/2 g or more.

Sodium montmorillonite and sodium bentonite also include those treated with sodium carbonate, such as sodium-activated montmorillonite, sodium-activated bentonite, sodium-substituted montmorillonite and sodium-substituted bentonite.

The powder (B) is, as mentioned above, a powder composed of a material other than montmorillonite and bentonite and having an average particle diameter of at least 10 µm and at most 30 µm. When the average particle diameter is less than 10 µm, the coated layer is less cracked with the course of time.

It is advisable that in order to more increase the above-mentioned effect, the powder (B) is composed of one or more powders (except montmorillonite and bentonite) having an average particle diameter of at least 10 µm and at most 30 µm, that is, a single powder when the powder (B) is composed of the single powder, or each of plural powders when the powder (B) is composed of the plural powders, has an average particle diameter of at least 10 µm and at most 30 µm. Unless the above-mentioned effect is impaired, a powder having an average particle diameter of less than 10 µm or more than 30 µm may be added thereto. However, the average particle diameter of the overall powder (B) is required to be at least 10 µm and at most 30 µm.

The average particle diameter of the powder (B) is preferably larger than that of the powder (A). More preferably, the average particle diameter of the powder (B) is at least 1.5 times but at most 60 times larger than that of the powder (A). As a result, the change in the cracking of the coated layer with the course of time can be decreased more effectively, and an excellent workability is provided in the coating.

Examples of the powder (B) include diatomaceous earths such as uncalcined diatomaceous earth (dry diatomaceous earth), calcined diatomaceous earth and flux-calcined diatomaceous earth; and inorganic powders for coating such as silica, talc, kaolin, perlite and calcium carbonate. These powders may be used either singly or in combination.

It is advisable that among diatomaceous earths, calcined diatomaceous earth and/or flux-calcined diatomaceous earth occupies at least 50% by weight of the powder (B). With calcined diatomaceous earth and flux-calcined diatomaceous earth rather than with uncalcined diatomaceous earth, the coated layer is cracked more easily, and the easy cracking remains unchanged with the course of time.

The coating composition in the present invention contains the coating material composed of the above-mentioned powders (A) and (B), and may further contain, as required, auxiliaries such as hydrophobic agents, plant hormones, plant nutrients, plant growth regulators, sterilants, oxygen generating agents and fertilizers. When containing such auxiliaries, it is advisable that the average particle diameter of the powders is 30 µm or less.

(2) Binder

A PVA aqueous solution having an aqueous solution viscosity at 25° C. of 50 mPa·s or less, preferably at least 1 mPa·s and at most 50 mPa·s is used as a binder. When the aqueous solution viscosity is higher than 50 mPa·s (25° C.), the cracking of the coated layer in water absorption is decreased with the course of time.

In order to increase the above-mentioned effect of the present invention, it is advisable that PVA has a degree of polymerization of from 300 to 1,800 and a degree of saponification of from 70 to 90%. When the degree of polymerization exceeds 1,800 and the degree of saponification exceeds 90%, the cracking of the coated layer in water absorption tends to be decreased with the course of time.

Further, from the standpoint of increasing the effect of the present invention, it is preferable that the purity of PVA is 95% by weight or more.

The other binder may be added as required unless the above-mentioned effect of the present invention is impaired. Further, auxiliaries such as plant hormones and plant nutrients and the like may be added unless the above-mentioned effect of the present invention is impaired.

(3) Coating method

For coating of seeds using the above-mentioned coating composition and binder, it is possible to use a variety of known coating machines such as an inclined rotary pan-type or a fluidized bed-type granulator and the like.

In the coating, while spraying the binder onto a seed using a spray and the like, the coating composition powder is added thereto to form the coated layer on the surface of the seed. At the initial stage of producing a coated seed, the coating composition can also be coated using only water not containing the binder. Thereafter, the binder is used. Thus, while maintaining good characteristics of the coated seed in accordance with the present invention, the influence of the binder on the growth can effectively be controlled at the same time.

The size of the thus-obtained coated seed is not unequivocally said because the weight and the size of the original seed are different. However, it may be the size in which the seed can be mechanically sowed, and it is not particularly limited.

The type of the seed to be coated is not particularly limited. An ordinary seed or a processed seed such as a peeled seed (naked seed) can be used. The light-favoured seed especially appropriate in the present invention refers to a seed which is hardly germinated without light, and it includes many types of flower seeds. Examples of such seeds include petunia, eustoma, begonia, coleus and antirrhinum.

Most of these flower seeds are fine seeds having an average particle diameter of 1 mm or less. The present invention is most effective for these fine light-favoured seeds.

When the surface of the coated seed is colored with an agent such as a pigment, a dye or the like to identify the coated seed, this agent may be incorporated into the coating composition or the binder unless the above-mentioned effect is impaired.

The present invention is illustrated more specifically by referring to the following Examples and Comparative Examples. However, the present invention is not limited thereto.

EXAMPLES 1 to 4

50 ml of seeds of eustoma having a germination rate of approximately 90% were charged into an inclined rotary pan, and coated using a coating composition and a binder shown in Table 1 until the diameter of coated seed reached approximately 1.5 mm. Then, the thus-coated seeds were dried at 30° C. for 3 hours. In Table 1, "parts" are parts by weight, and "particle diameter" is an average particle diameter.

In Table 1, rate of formation of seedless spherical pellets (rate of by-product formation) in coating is shown. The rate of by-product formation refers to a rate (%) of formation of seedless spherical pellets among spherical pellets obtained by coating. It was measured by examining 500 spherical pellets obtained.

The thus-obtained coated seeds were subjected to a germination test immediately after production, and after 3 months, 6 months and 12 months from the production. In the germination test, germination vigors and germination rates were measured. In the germination test, two filter papers were laid on a petri dish having a diameter of 9 cm, 4 ml of water was poured on the papers and 100 coated seeds were put thereon. The petri dish was stored in a constant-temperature device of 20° C. Since seed-containing spherical pellets and seedless spherical pellets could not be distinguished with a naked eye, the germination test was conducted without separating seedless spherical pellets. The results are shown in Table 1.

TABLE 1

| Ex. No. | Coating composition Powder (A) [1] Bentonite | Montmorillonite | Powder (B) | Particle diameter ratio [2] |
|---|---|---|---|---|
| 1 | 5 parts Particle diameter: 5 μm Swelling force: 20ml/2 g | 0 part | Flux-calcined diatomaceous earth: 95 parts (particle diameter 21 μm) | 4.2 |
| 2 | 10 parts Particle diameter: 10 μm Swelling force: 15 ml/2 g | 0 part | Calcined [7] diatomaceous earth: 70 parts (particle diameter 21 μm) Perlite: 20 parts (particle diameter 8 μm) | 1.6 |
| 3 | 22 parts Particle diameter: 2 μm Swelling force: 12 ml/2 g | 0 part | Talc: 78 parts (particle diameter 22 μm) | 11.0 |
| 4 | 0 part | 2 parts Particle diameter: 1 μm Swelling force: 40 ml/2 g | Silica: 40 parts (particle diameter 25 μm) Flux-calcined diatomaceous earth: 58 parts (particle diameter 25 μm) | 25.0 |

TABLE 1-continued

| Ex. No. | Binder [3] [4] | Rate of by-product formation (%) | Immediately after production Germination vigor [5] | Immediately after production Germination rate [6] |
|---|---|---|---|---|
| 1 | Polyvinyl alcohol 3% Polymerization degree: 1,750 Saponification degree: 79.5% Viscosity: 18 mPa · s | 0 | 52 | 92 |
| 2 | Polyvinyl alcohol 2% Polymerization degree: 550 Saponification degree: 79.5% Viscosity: 2 mpa · s | 0 | 50 | 90 |
| 3 | Polyvinyl alcohol 4% Polymerization degree: 1,750 Saponification degree: 88.0% Viscosity: 30 mPa · s | 0 | 45 | 88 |
| 4 | Polyvinyl alcohol 5% Polymerization degree: 550 Saponification degree: 88.0% Viscosity: 7 mpa · s | 0 | 47 | 90 |

| | After 3 months | | After 6 months | | After 12 months | |
|---|---|---|---|---|---|---|
| Ex. No. | Germination vigor [5] | Germination rate [6] | Germination vigor [5] | Germination rate [6] | Germination vigor [5] | Germination rate [6] |
| 1 | 53 | 91 | 50 | 91 | 47 | 90 |
| 2 | 48 | 89 | 47 | 89 | 44 | 88 |
| 3 | 40 | 85 | 38 | 82 | 36 | 80 |
| 4 | 47 | 90 | 44 | 86 | 40 | 85 |

Ex. - Example
[1] Sodium bentonite was used as bentonite, and sodium montmorillonite as montmorillonite respectively.
[2] Particle diameter ratio = [average particle diameter of powder (B)] / [average particle diameter of powder (A)]
[3] The concentration of the polyvinyl alcohol aqueous solution is indicated in terms of % by weight.
[4] The viscosity was measured at 25° C. using a B-type viscometer.
[5] The germination vigor is a rate (%) of seeds germinated on Day 7 after the start-up of the germination test.
[6] The germination rate is a rate (%) of seeds germinated on Day 14 after the start-up of the germination test.
[7] In the powder (B) in Example 2, the average particle diameter of the overall mixture was 16 μm.

COMPARATIVE EXAMPLES 1 TO 3

The coating was conducted as in Examples 1 to 4 using the coating composition and the binder shown in Table 2. A rate of by-product formation was measured, and the coated seeds obtained were subjected to a germination test. The results are shown in Table 2.

TABLE 2

| CEx. No. | Coating composition Powder (A) [1] Bentonite | Montmorillonite | Powder (B) | Particle diameter ratio [2] |
|---|---|---|---|---|
| 1 | 40 parts Particle diameter: 5 μm Swelling force: 12 ml/2 g | 0 part | Calcined [8] diatomaceous earth: 40 parts (particle diameter 25 μm) Perlite: 20 parts (particle diameter 27 μm) | 5.1 |
| 2 | 5 parts Particle diameter: 5 μm Swelling force: 12 ml/2 g | 0 part | Talc: 95 parts (particle diameter 22 μm) | 4.4 |
| 3 | 0 part | 5 parts Particle diameter: 2 μm Swelling force: 50 ml/2 g | Talc: 95 parts (particle diameter 5 μm) | 2.5 |

| CEx. No. | Binder [3] [4] | Rate of by-product formation (%) | Immediately after production Germination vigor [5] | Germination rate [6] |
|---|---|---|---|---|
| 1 | Polyvinyl alcohol 5% Polymerization degree: 2,000 Saponification degree: 88.0% Viscosity: 70 mPa·s | 27 | 30 | 60 |
| 2 | Polyvinyl alcohol 5% Polymerization degree: 2,000 Saponification degree: 88.0% Viscosity: 70 mpa·s | 18 | 33 | 69 |
| 3 | Polyvinyl alcohol 3% Polymerization degree: 1,750 Saponification degree: 79.5% Viscosity: 18 mPa·s | 0 | 43 | 86 |

| CEx. No. | After 3 months Germination vigor [5] | Germination rate [6] | After 6 months Germination vigor [5] | Germination rate [6] | After 12 months Germination vigor [5] | Germination rate [6] |
|---|---|---|---|---|---|---|
| 1 | 20 | 42 | 16 | 33 | 11 | 24 |
| 2 | 22 | 53 | 18 | 40 | 9 | 28 |
| 3 | 33 | 69 | 25 | 52 | 22 | 40 |

CEx. - Comparative Example
[1] to [6]: Same as in Table 1.
[8] An average particle diameter of the overall mixture in the powder (B) of Comparative Example 1 was 25.5 μm.

As is clear from the above-mentioned tables, formation of seedless spherical pellets was not observed at all in Examples 1 to 4. Meanwhile, the rate of formation of seedless spherical pellets was high in Comparative Examples 1 and 2. Further, with respect to the coated seeds in Examples 1 to 4, the germination vigor and the germination rate immediately after production were high compared with those in Comparative Examples 1 and 2 in consideration of the presence of the seedless spherical pellets. Besides, even after 12 months, the germination vigor and the germination rate were less decreased. On the contrary, in the coated seeds in Comparative Examples 1 and 2, the germination vigor and the germination rate were greatly decreased with the course of time.

In Comparative Example 3, formation of seedless spherical pellets was not observed at all, and the germination vigor and the germination rate immediately after production were relatively high. However, the germination vigor and the germination rate were greatly decreased with the course of time.

As stated above, in accordance with the present invention, the combination of the above-mentioned coating composition and the binder, the coated layer of the coated seed easily absorbs water, and is easily cracked. Further, the easy cracking thereof remains unchanged with the course of time. Still further, formation of by-product seedless spherical pellets is little observed. In spite of the use of the binder, the coated layer is cracked well in water absorption, and satisfactorily peeled off from the seed, with the result that there is almost no influence of the binder on the growth of the seed. Consequently, especially light-favoured seeds requiring light in the germination are liable to receive light, resulting in good germination.

What is claimed is:

1. A coated seed which is obtained by coating a seed with from 0.1 to 25% by weight of a powder (A) composed of one or both of montmorillonite and bentonite and having an average particle diameter of 30 μm, or less and from 99.9 to 75% by weight of a powder (B) composed of a material other than montmorillonite and bentonite and having an average particle diameter of at least 10 μm and at most 30 μm using a polyvinyl alcohol aqueous solution having an aqueous solution viscosity at 25° C. of 50 mPa·s or less as a binder.

2. The coated seed of claim 1, wherein one or both of calcined diatomaceous earth and flux-calcined diatomaceous earth occupy at least 50% by weight of the powder (B).

3. The coated seed of claim 1, wherein montmorillonite and bentonite of said powder (A) are sodium montmorillonite and sodium bentonite having a swelling force of 12 ml/2 g or more.

4. The coated seed of claim 1, wherein said polyvinyl alcohol has a degree of polymerization of from 300 to 1,800 and a degree of saponification of from 70 to 90%.

5. The coated seed of claim 1, wherein said seed is a light-favoured seed.

6. A process for producing a coated seed, which comprises coating a seed with from 0.1 to 25% by weight of a powder (A) composed of one or both of montmorillonite and bentonite and having an average particle diameter of 30 μm or less and from 99.9 to 75% by weight of a powder (B) composed of a material other than montmorillonite and bentonite and having an average particle diameter of at least 10 μm and at most 30 μm using a polyvinyl alcohol aqueous solution having an aqueous solution viscosity at 25° C. of 50 mPa·s or less as a binder.

7. The process of claim 6, wherein one or both of calcined diatomaceous earth and flux-calcined diatomaceous earth occupy at least 50% by weight of the powder (B).

8. The process of claim 6, wherein montmorillonite and bentonite of said powder (A) are sodium montmorillonite and sodium bentonite having a swelling force of 12 ml/2 g or more.

9. The process of claim 6, wherein said polyvinyl alcohol has a degree of polymerization of from 300 to 1,800 and a degree of saponification of from 70 to 90%.

10. The process of claim 6, wherein said seed is a light-favoured seed.

* * * * *